(12) United States Patent
Naunheimer et al.

(10) Patent No.: US 7,906,081 B2
(45) Date of Patent: *Mar. 15, 2011

(54) INTERNAL GRIDS FOR ADSORBENT CHAMBERS AND REACTORS

(75) Inventors: Christopher Naunheimer, Arlington Heights, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 458 days.

This patent is subject to a terminal disclaimer.

(21) Appl. No.: 12/119,569

(22) Filed: May 13, 2008

(65) Prior Publication Data

US 2009/0285730 A1    Nov. 19, 2009

(51) Int. Cl.
- B01J 8/02    (2006.01)
- B01J 8/04    (2006.01)
- B01J 8/44    (2006.01)

(52) U.S. Cl. ........ 422/218; 422/602; 422/631; 422/636; 422/211; 422/220; 422/239; 422/311

(58) Field of Classification Search ................... 422/190, 422/192, 211, 218, 220, 239, 311; 34/582–584, 34/174; 96/139, 152; 210/291, 286

See application file for complete search history.

(56) References Cited

U.S. PATENT DOCUMENTS

| 2,634,194 | A | * | 4/1953 | Nebeck | 422/218 |
|---|---|---|---|---|---|
| 3,480,406 | A | | 11/1969 | Luckenbach | 23/288 |
| 4,021,499 | A | | 5/1977 | Bieser | 260/674 SA |
| 4,036,779 | A | | 7/1977 | Schatz et al. | 252/417 |
| 4,079,094 | A | | 3/1978 | Rosback et al. | 260/674 SA |
| 4,096,911 | A | * | 6/1978 | Geske | 166/234 |
| 4,108,915 | A | | 8/1978 | Rosback et al. | 260/674 SA |
| 4,126,539 | A | | 11/1978 | Derr, Jr. et al. | 208/108 |
| 4,193,910 | A | | 3/1980 | Rohrbach et al. | 260/42.43 |
| 4,251,675 | A | | 2/1981 | Engel | 585/422 |
| 4,276,265 | A | * | 6/1981 | Gillespie | 422/311 |
| 4,421,723 | A | * | 12/1983 | Farnham | 422/218 |
| 4,435,279 | A | | 3/1984 | Busch et al. | 208/111 |
| 4,497,792 | A | | 2/1985 | Gindler | 424/3 |
| 4,567,022 | A | | 1/1986 | Greenwood | 422/144 |
| 4,721,603 | A | | 1/1988 | Krug et al. | 422/147 |
| 4,778,941 | A | | 10/1988 | Tagamolila | 585/319 |
| 4,971,771 | A | * | 11/1990 | Stahl | 422/218 |

(Continued)

FOREIGN PATENT DOCUMENTS

GB    1128244    9/1968

OTHER PUBLICATIONS

U.S. Appl. No. 12/119,566, filed Nov. 19, 2009, Naunheimer et al.

(Continued)

*Primary Examiner* — Walter D Griffin
*Assistant Examiner* — Huy-Tram Nguyen
(74) *Attorney, Agent, or Firm* — Mark Goldberg

(57) ABSTRACT

A milled plate is presented that is provided for use in a radial flow reactor. The milled plate has narrow slots milled in the plate on the solid particle side and slots of slightly greater width milled on the fluid side of the plate. The plates provide strength to support the pressure from solid particles that currently is not present in wire screen meshes.

13 Claims, 4 Drawing Sheets

U.S. PATENT DOCUMENTS

| | | | |
|---|---|---|---|
| 5,089,115 A * | 2/1992 | Koves | 208/146 |
| 5,118,419 A * | 6/1992 | Evans et al. | 210/291 |
| 5,156,738 A * | 10/1992 | Maxson | 210/274 |
| 5,302,357 A | 4/1994 | Kramer et al. | 422/219 |
| 5,380,426 A | 1/1995 | Johnson et al. | 208/113 |
| 5,618,426 A * | 4/1997 | Eischen et al. | 210/541 |
| 5,827,485 A * | 10/1998 | Libal et al. | 422/179 |
| 6,096,937 A | 8/2000 | Butler et al. | 585/440 |
| 6,106,702 A | 8/2000 | Sohn et al. | 208/310 Z |
| 6,225,518 B1 | 5/2001 | Sohn et al. | 585/826 |
| 6,612,731 B2 | 9/2003 | Nishida et al. | 366/173.2 |
| 6,706,938 B2 | 3/2004 | Roeseler et al. | 585/820 |
| 6,740,788 B1 | 5/2004 | Maher et al. | 585/319 |
| 6,762,335 B1 | 7/2004 | Prince et al. | 585/440 |
| 6,855,854 B1 | 2/2005 | James, Jr. | 585/323 |
| 6,858,769 B2 | 2/2005 | Woodle et al. | 585/658 |
| 6,894,201 B1 | 5/2005 | Schmidt et al. | 585/448 |
| 7,094,939 B1 | 8/2006 | Jeanneret | 585/323 |
| 7,105,711 B2 | 9/2006 | Merrill | 585/266 |
| 7,118,715 B1 | 10/2006 | Hedrick et al. | 422/144 |
| 7,128,826 B2 | 10/2006 | Eldin et al. | 208/48 AA |
| 7,128,883 B2 | 10/2006 | James, Jr. | 422/211 |
| 7,205,448 B2 | 4/2007 | Gajda et al. | 585/823 |
| 7,226,568 B1 * | 6/2007 | Ham et al. | 422/218 |
| 7,276,636 B2 | 10/2007 | Jeanneret | 585/323 |
| 7,718,146 B2 * | 5/2010 | Naunheimer et al. | 422/190 |
| 7,749,467 B2 * | 7/2010 | Naunheimer et al. | 422/218 |
| 2008/0107575 A1 * | 5/2008 | Vetter et al. | 422/211 |

OTHER PUBLICATIONS

U.S. Appl. No. 12/119,570, filed Nov. 19, 2009, Naunheimer et al.

* cited by examiner

INTERNAL GRIDS FOR ADSORBENT CHAMBERS AND REACTORS

FIELD OF THE INVENTION

This invention relates to cross-flow reactors or adsorbers where a fluid flows across a moving bed of catalyst or adsorbent. In particular, this relates to the internal components for distribution flow of the fluid and for providing a device for preventing the flow of catalyst or adsorbent across the inlet or outlet screens.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For either a fixed bed or moving bed, the screen or mesh provides a barrier to prevent the loss of solid catalyst particles while allowing fluid to flow through the bed. In a moving bed, solid catalyst particles are added at the top, and flow through the apparatus and removed at the bottom, while passing through a screened-in enclosure that permits the flow of fluid over the catalyst. In a fixed bed, the catalyst, or adsorbent, is loaded into a bed between screens, or other retention devices, and the screens allow fluid to flow over the catalyst while holding the catalyst in place. The screen is preferably constructed of a non-reactive material, but in reality the screen often undergoes some reaction through corrosion, and over time problems arise from the corroded screen or mesh.

One type of screen is a profile wire screen, where a profile wire is wrapped around supports and set at a predetermined spacing for the wire as it is wrapped around the supports. The screen is then cut and flattened and then re-rolled or re-shaped. The screen is shown in U.S. Pat. Nos. 2,046,458 and 4,276,265. The screen can be used as part of an inlet distribution device, or other device for containing a catalyst. One type of inlet distribution device is a reactor internal having a scallop shape and is described in U.S. Pat. Nos. 6,224,838 and 5,366,704. The scallop shape and design provides for good distribution of gas for the inlet of a radial flow reactor, but uses screens or meshes to prevent the passage of solids. The scallop shape is convenient because it allows for easy placement in a reactor without concern regarding the curvature of the vessel wall. The screens or meshes used to hold the catalyst particles within a bed are sized to have apertures sufficiently small that the particles cannot pass through.

The design of reactors to overcome these limitations can save significantly on downtime for repairs and on the loss of catalyst, which is a significant portion of the cost of processing hydrocarbons.

BRIEF SUMMARY OF THE INVENTION

The present invention provides for a new screen design that provides greater strength and thus reduces the failure of a reactor during operation. The invention comprises a screen comprising a plate having sufficient thickness to withstand the stresses associated with a mass of solid particles on one side of the screen with fluid on the other side. The plate comprises a solid particle side and a fluid side. In the solid particle side, slots are milled in a parallel manner, and extend to within 20 to 50 mm of each end of the plate. The solid particle side slots are milled to a depth of between 5% and 50% of the thickness of the plate. In the fluid side, slots are milled in a parallel manner, and to a depth sufficient to intersect with the slots milled in the solid particle side, or to a depth between 50% and 95% the thickness of the plate. The fluid side slots are milled to be a greater width than the solid particle side slots. While the terms 'milled' and 'milling' are often used to denote standard manufacturing techniques for forming metal plates, it is meant that the terms include any manufacturing method for forming slots, depressions, or holes in metal plates. The terms 'milled' and 'milling' are used for convenience hereinafter.

In an alternate embodiment, the slots are not milled to be a continuous length of the plate, but are milled to a length between 60 and 200 mm. long with break between slots in the longitudinal direction of a distance between 5 mm and 50 mm. This provides additional strength to the milled screen.

The plate is sufficiently thick to provide strength that is lacking in wire screen meshes, while enabling a thinner overall profile because of the lack of support rods and equipment associated with profile wire screen meshes.

Other objects, advantages and applications of the present invention will become apparent to those skilled in the art from the following detailed description and drawing.

Other objects, advantages and applications of the present invention will become apparent to those skilled in the art from the following detailed description and drawings.

DETAILED DESCRIPTION OF THE INVENTION

Figure 1:
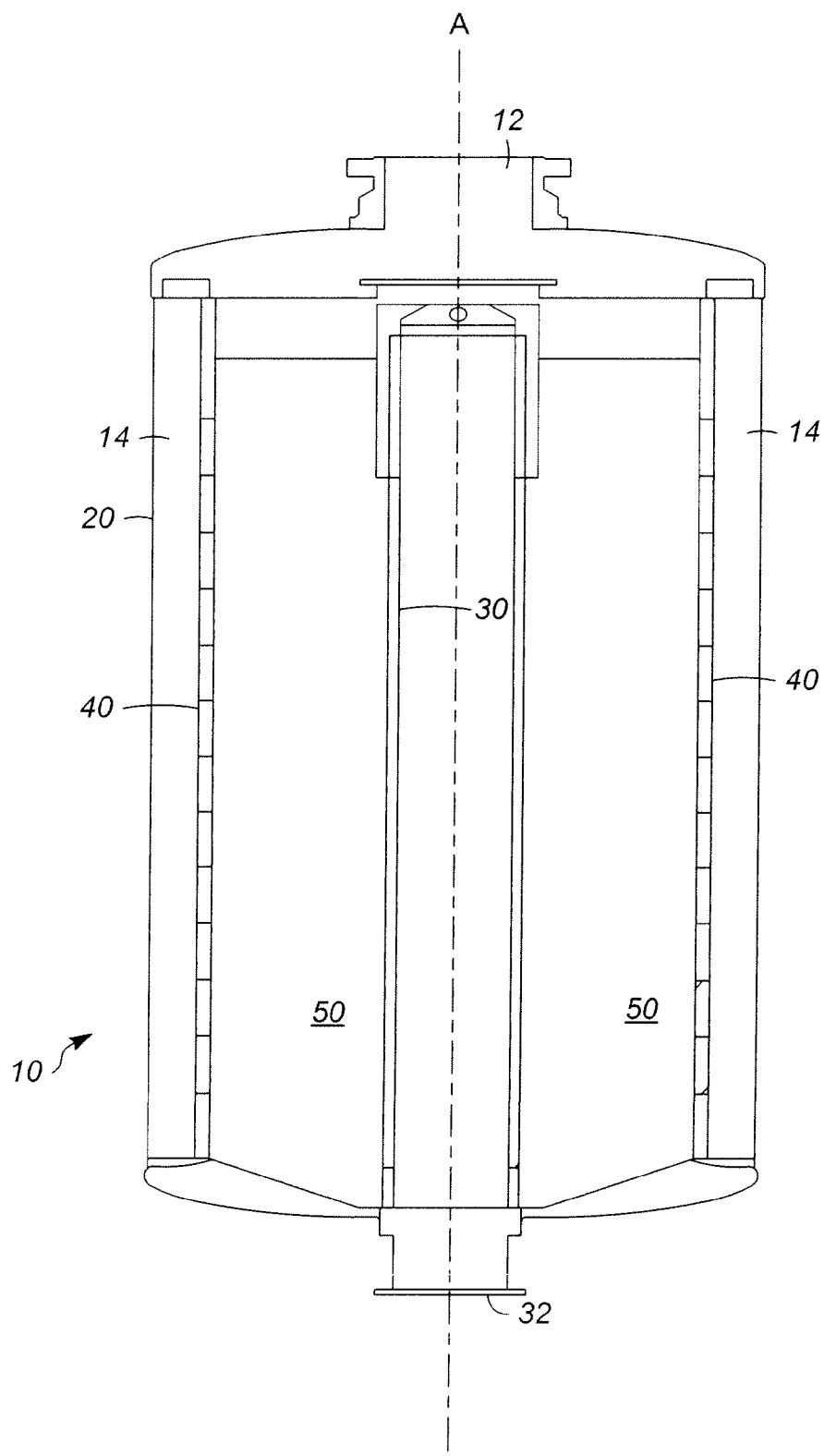
FIG. 1 is a vertical cross section of a radial flow reactor.

With the increase in use of plastics, there is an increase in the production of the monomers for the plastics. As production is increased, the reactors for producing the monomers have increased in size. Many of the reactors become subject to physical constraints, such as the strength of materials in the reactor internals. Radial flow reactors are often harsh environments, and in addition to being harsh chemical environments, the operating conditions are severe in terms of pressure and temperature which induces tremendous stresses on the screens in radial flow reactors. Thermal cycles and the weight of the catalyst can cause buckling of the screens. Stronger screens or devices for retaining catalyst are needed.

Radial flow reactors, and cross-flow adsorbent systems in general, need screens to contain the catalysts and/or adsorbents used in the reactors or adsorbent systems. While the present invention is described in terms of a reactor system, the equipment of the present invention is applicable to adsorbers, or other equipment used in contacting fluids with solids.

Adsorbent chamber internals grids are currently used in the UOP Sorbex process to separate individual adsorbent beds. The grids currently used are manufactured using profile wire construction. There is a considerable amount of cold-working required to get the profile wire grids flat enough to meet the required tolerances for the UOP Sorbex process. In addition, there are substantial manufacturing challenges, such as the initial welding and/or the repairing of individual profile wires to not only the support rods for the profile wires, but also the solid plates used to hold the profile wire grids in place in an adsorbent chamber.

Using a milled plate, as described herein, can offer significant advantages in the manufacture of adsorbent chamber internal grids, or reactor internal grids. The milled plate is fabricated flat so there is no need for post processing of the grid after the slots are cut. However, it is also possible to cold-roll the plate after the slots are milled to form a curved grid, if so desired. The milled plated is also fabricated in a manner to obviate problems associated with the manufacture of the profile wire grids. The milled plate can be milled to leave a section at each end, top and bottom, where a solid piece of metal is welded to the plate before the milled plate is inserted into a reactor. The solid plate is a partition that separates regions in a reactor where catalyst is added to the reactor and fluids to be processed by flow over the catalyst is prevented from entering regions above the catalyst bed.

The present invention comprises a milled plate for retaining a granular solid in a reactor or an adsorber. The apparatus is a plate having a solid particle side, a fluid side and a thickness. The solid particle side has slots formed therein in a parallel manner, and the fluid side has slots formed therein in a parallel manner such that the fluid side slots intersect the solid particle side slots, and allows for fluid to flow through the plate. The slots milled in the solid particle side have a width of less than 1.0 mm, preferably less than 0.7 mm, and more preferably less than 0.5 mm. The slots milled in the fluid side have a width greater than the slots milled in the solid particle side, and will have a width of approximately 1.0 mm. The slots milled in the solid particle side will be milled to a depth of between 0.05 and 0.5 times the thickness of the plate, with a preferred depth between 0.1 and 0.25 times the thickness of the plate. The slots milled in the fluid side of the plate will be milled to a depth between 0.5 and 0.95 times the thickness of the plate, with a preferred depth between 0.75 and 0.9 times the thickness of the plate. A typical plate thickness is 5 mm, but the plates can be thicker, or thinner, depending on the environment into which the plates are placed. Environments that are more severe, in terms of pressure, or forces on the faces of the plate will need thicker plates, and which can be 5 and 30 mm thick.

In order to maintain sufficient strength of the plate, while maximizing the openings in the plate, the milled slots on the solid particle side will be from 50 to 200 mm. long, and will be spaced 1 to 5 mm apart from centerline to centerline of the slots. Slots, in the direction along the slots length, or longitudinally, will have a spacing from 5 mm to 50 mm between the ends of the slots, and will end a distance from the end of the plate between 10 and 100 mm. Preferably, the slots will be at least 100 mm long, and the longitudinal spacing will be between 5 mm and 30 mm, with a distance from the end of the plate between 20 mm and 40 mm.

The spacing at the ends of the slotted plate of the present invention enables welding of the slotted plate to a solid plate. The weld connection is more conveniently fabricated and provides a stronger connection and greater integrity over the welding of a profile wire screen to a solid plate. The solid plate is added for the upper and lower portions of the reactor, or adsorber, where solid material is added or withdrawn from the reactor. In the upper and lower regions, is it intended to prevent flow of fluid that would bypass the catalyst in the reactor.

In an alternate configuration, the milled slots in the fluid side are milled at an angle with respect to the milled slots in the solid particle side. The angle can be between 5 degrees and 175 degrees, with a substantially perpendicular configuration forming a plate that has a grid of openings, rather than slots extending through the plate.

In one embodiment, the present invention comprises a partition for use in a radial flow reactor, or radial flow adsorber. The radial flow reactor comprises a cylindrical reactor shell with a centerpipe and a substantially cylindrical partition that is in a surrounding relationship to the centerpipe. The cylindrical partition is a frusto-conical structure comprising a plurality of plates, wherein the plates are held in place to form a substantially cylindrical structure, but also can be a tapered structure forming a frustum of a cone. The term frusto-conical as used herein is meant to include substantially cylindrical structures as well as frustums. The plates have a solid particle side, a fluid side and a thickness, wherein each plate has slots milled into the plate in a parallel manner in the axial direction. The slots in the plate are milled in the solid particle side to a width of less than 1 mm, preferably with a width of less than 0.7 mm, and more preferably less than 0.5 mm. The plates are further milled to have slots on the fluid side, wherein the slots in the fluid side intersect the slots from the solid particle side, and the width of the slots in the fluid side have a width greater than the width of the slots in the solid particle side.

In a variation of this embodiment, the plates can be rolled to have a slight curvature, such that the curvature is within 25% of the curvature of the frusto-conical structure.

The present invention is useful for decreasing the size, thickness, of the screen used to retain solid particles in a reactor or adsorber, as shown in FIG. 1. FIG. 1 shows a typical radial flow reactor 10 which comprises a reactor shell 20, a centerpipe 30, a screened partition 40, and a solid particle, or catalyst, bed 50. A fluid enters the reactor 10 through an inlet 12, is directed to an outer gap 14 between the shell 20 and the screened partition 40. The fluid flows through the screened partition 40, across the catalyst bed 50, where the fluid reacts to form a product stream, and into the centerpipe 30. The product stream is collected in the centerpipe 30 and passes through a reactor exit 32. As commercially practiced, the reactor screen 40 is a profile wire screen that is subject to many stresses and can 'fisheye' where two neighboring wires separate locally. The integrity of the screen 40 is important as loss of integrity can result in loss of catalyst, collapse of the reactor, resulting in inefficiencies of the reaction process and increased down time to repair the reactor. The profile wire screen also requires support rods that affect flow and create a screen with a substantial thickness to accommodate the support rods and other materials needed to build the screen.

A screen 40 of the present invention comprises a plurality of thick plates that provide greater strength against flexing of the wires, and greater axial strength against collapse of the screen. The screen 40 can be made thicker according to the needs of the reactor conditions, and still be thinner than the profile wire screen. This enables the use of a larger catalyst bed in the same sized reactor shell 20.

Figure 2:
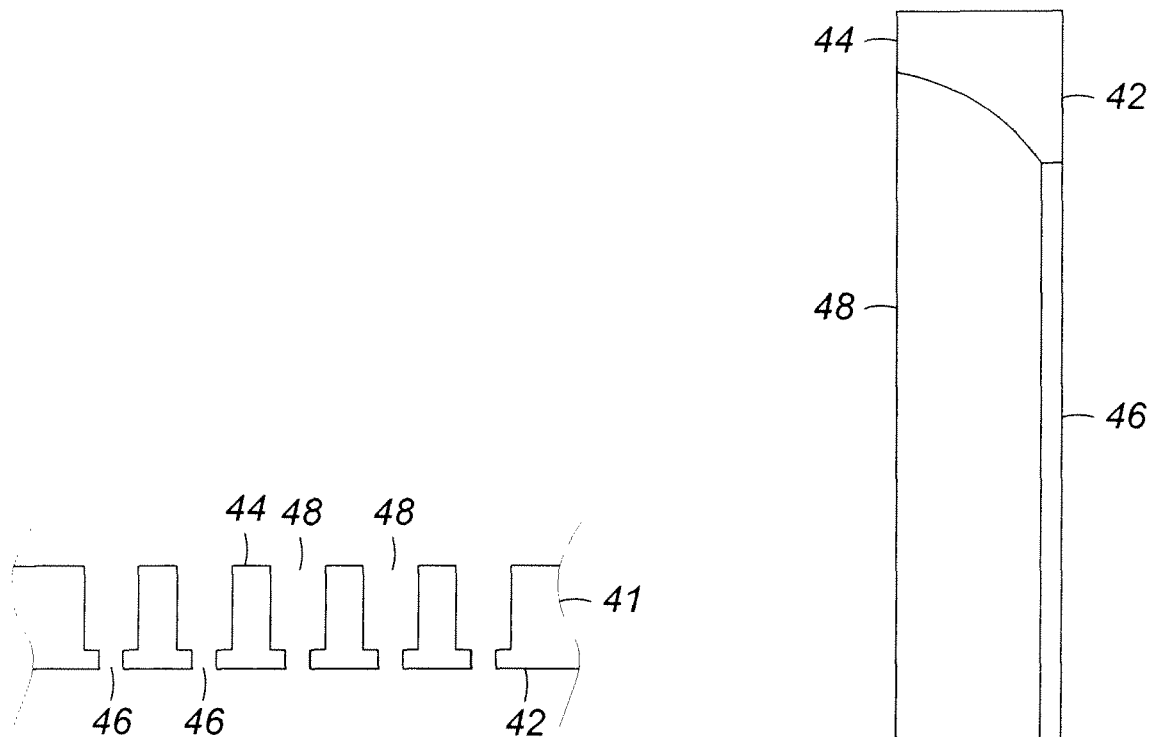
FIG. 2 is a horizontal cross-section of the milled-milled plate showing the slots from the particle side and the slots from the fluid side.
Figure 3:
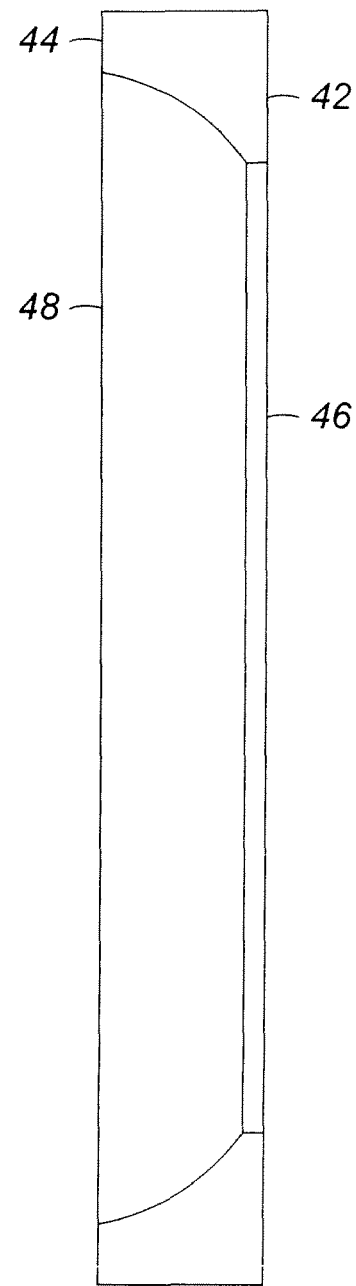
FIG. 3 is a vertical cross-section of the milled-milled plate showing the slots from the particle side and the slots from the fluid side.

The screen 40 comprises a plurality of plates 41. A horizontal cross-section of one plate is shown in FIG. 2, wherein there is a solid particle side 42 and a fluid side 44. The solid particle side 42 includes slots 46 milled into the plate 41. The solid particle side slots 46 preferably have a width of about 0.5 mm or less. The fluid side 44 of the plate 41 are milled with slots 48 that extend into the plate 41 to intersect the slots 46 from the solid particle side 42. The fluid side slots 48 are milled to a width greater than the slots 46 in the solid particle side to allow fines to be more readily removed. The slots 46 do not extend the entire length of the plate, but milled to distance of at least 20 mm from the edge of the plate. This leaves a section of plate that is solid and can be welded to a solid, unmilled, plate. A vertical cross-section of one embodiment is shown in FIG. 3, where the solid particle side slots 46 are milled to a depth of between 5% and 50% of the plate 41 thickness. The fluid side slots 48 are milled to a depth between 50% and 95% of the plate 41 thickness. The fluid side slots 48 will often have a longer length than the slots on the solid particle side 42 due to the nature of milling slots in a plate.

Figure 4:
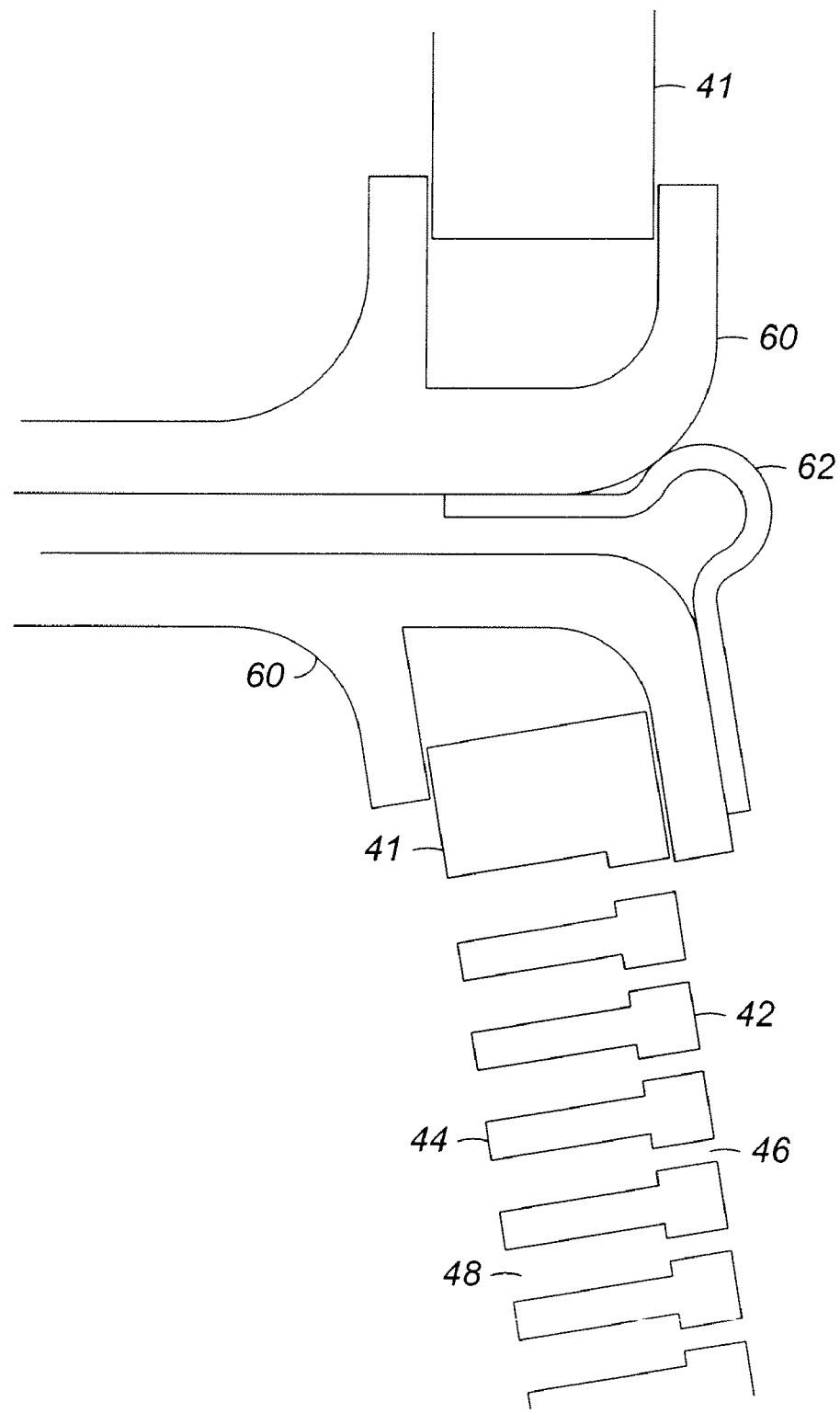
FIG. 4 is a top down view of a cross-section of the screen held by side support members.

FIG. 4 presents the plate 41 presents a horizontal cross-sectional view of the milled plate 41 as it is held by brackets 60. The brackets 60 hold the plates 41 in position in a circumferential manner around the central axis of the reactor. The brackets 60 can be held in place by supports, or can be a portion of a larger support for holding the plates 41. Flexible standoff members 62 can be used to create a seal between neighboring plates 41, or neighboring plate brackets 60, and allow for flexibility of positioning the plates 41 and brackets 60 within the reactor.

Figure 5:
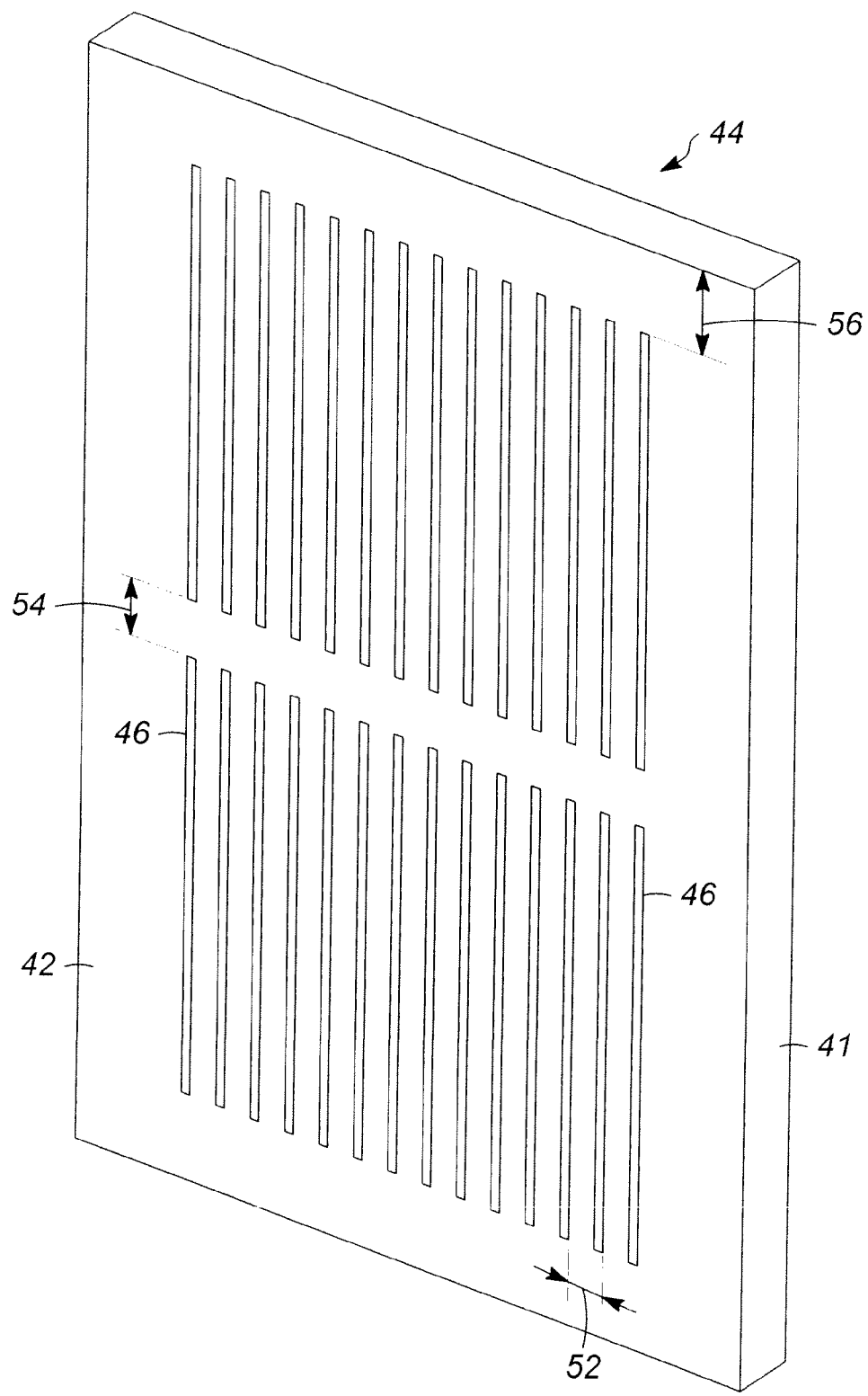
FIG. 5 is a milled plate of the present invention.

FIG. 5 shows a plate 41 of the present invention. The plate 41 comprises the solid particle side 42 and the fluid side 44 with milled slots 46 in the solid particle side 42. The slots 42 have a horizontal spacing 52 from 1 to 5 mm with the spacing 52 preferably greater than 2 mm from centerline to centerline of adjacent slots 42. The slots 46 arranged in a parallel manner, and are not required to extend the entire length of the plate 41. In the longitudinal direction, or the direction along the length of the slots 46, the slots 46 have a longitudinal spacing 54 of between 5 mm and 30 mm, and extend to a distance 56 from the end of the plate of between 10 mm and 100 mm, with a preferred distance 56 between 20 mm and 40 mm.

In an alternate embodiment the slots 46 in the solid particle side 42 are not parallel to the slots 48 in the fluid side 44. When milling the slots on the fluid side 44 at an angle between 30 degrees and 150 degrees relative to the slots on the solid particle side, the slots can be milled to the end of the plate. However, it is preferred to leave the end of the plate unmilled for purposes of welding the end of the plate to a solid plate. The solid plate acts as a barrier to fluids and solids at the top of the reactor and the bottom of the reactor to insure good contact between the fluid and solid and to prevent fluid by-passing the solid bed by flowing over the top of the catalyst bed.

While the invention has been described with what are presently considered the preferred embodiments, it is to be understood that the invention is not limited to the disclosed embodiments, but it is intended to cover various modifications of the plates, combinations of plates, and equivalent arrangements included within the scope of the appended claims.

The invention claimed is:

1. An apparatus for use as a partition for retaining a solid in a reactor comprising:
a plate having a solid particle side, a fluid side and a thickness, wherein the solid particle side comprises a milled plate having solid particle side slots formed therein in a parallel manner and the fluid side comprises a milled plate having fluid side slots formed therein in a parallel manner, and where the solid particle side slots intersect the fluid side slots to provide a plate allowing fluid to flow through the plate.

2. The apparatus of claim 1 wherein the solid particle side slots have a width less than or equal to 0.7 mm, and the fluid side slots have a width greater than the solid particle side slots.

3. The apparatus of claim 2 wherein the solid particle side slots have a width less than or equal to 0.5 mm.

4. The apparatus of claim 2 wherein the solid particle side slots have a depth from between 0.05 and 0.5 times the thickness of the plate.

5. The apparatus of claim 2 wherein the fluid side slots have a depth from between 0.5 and 0.95 times the thickness of the plate.

6. The apparatus of claim 1 wherein the solid particle side slots have a length of at least 50 mm with a spacing between longitudinally oriented slots of at between 5 mm and 30 mm.

7. The apparatus of claim 1 wherein the solid particle side slots extend to at least 20 mm from the end of the plate.

8. An apparatus for containing a solid particulate matter comprising:
a plurality of plates affixed to form a frusto-conical structure, wherein each of the plates comprises a milled plate having a solid particle side, a fluid side and a thickness, and wherein each plate has slots milled into the plate in a parallel manner in the axial direction, and a plurality of plates are arrayed about a central axis forming the frusto-conical structure.

9. The apparatus of claim 8 wherein the plates have a curved structure, and the curve is within 25% of the curvature of the frusto-conical structure.

10. The apparatus of claim 8 wherein the slots in the solid particle side have a width less than or equal to 1 mm.

11. The apparatus of claim 10 wherein the slots in the solid particle side have a width less than or equal to 0.7 mm.

12. The apparatus of claim 11 wherein the slots in the solid particle side have a width of less than or equal to 0.5 mm.

13. The apparatus of claim 8 wherein the fluid side slots have a greater width than the solid particle side slots.

* * * * *